(12) United States Patent
Connolly et al.

(10) Patent No.: US 11,263,678 B2
(45) Date of Patent: Mar. 1, 2022

(54) SYSTEM, METHOD, AND COMPUTER-READABLE STORAGE MEDIUM FOR INTERACTIVE KIOSKS

(71) Applicant: Accenture Global Solutions Limited, Dublin (IE)

(72) Inventors: Colleen Connolly, Dublin (IE); Ian Harris, Dublin (IE); Ruth Kelly, Dublin (IE); Simon Definis, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 647 days.

(21) Appl. No.: 15/583,232

(22) Filed: May 1, 2017

(65) Prior Publication Data

US 2018/0315107 A1    Nov. 1, 2018

(51) Int. Cl.
*G06Q 30/00* (2012.01)
*G06Q 30/06* (2012.01)
(Continued)

(52) U.S. Cl.
CPC ......... *G06Q 30/0623* (2013.01); *G06Q 20/18* (2013.01); *G06Q 20/208* (2013.01);
(Continued)

(58) Field of Classification Search
CPC . G06Q 30/0601–0645; G06Q 30/0268; G06Q 20/18; G06Q 20/208; G06Q 20/322
(Continued)

(56) References Cited

U.S. PATENT DOCUMENTS 8,818,873 B1    8/2014  Kim et al.
2001/0051876 A1  12/2001  Seigel et al.
(Continued)

FOREIGN PATENT DOCUMENTS

CN    101014951    8/2007
CN    101288283    10/2008
(Continued)

OTHER PUBLICATIONS

"Pharmabox Allows Public to Request a Kiosk: Provides Means to Improve Access to Products and Increase the Quality of Life for People Nationwide." PR Newswire, Jul. 21, 2015, p. n/a. ProQuest. Web. Dec. 22, 2021 . (Year: 2015).*
(Continued)

*Primary Examiner* — Jeffrey A. Smith
*Assistant Examiner* — Kennedy Gibson-Wynn
(74) *Attorney, Agent, or Firm* — Fish & Richardson P.C.

(57) ABSTRACT

An interactive kiosk includes a display, a microphone, and one or more processors that perform operations including receiving user input provided as a spoken query of a user, receiving user-specific data, querying, by a virtual agent, one or more back-end systems based on the user input, and the user-specific data to provide one or more responses, displaying one or more graphical representations of the one or more responses to the user on the display, the one or more graphical representations depicting at least one product for purchase, facilitating a purchase of the at least one product, and providing instructions to the passenger for physical retrieval of the at least one product within a location.

27 Claims, 6 Drawing Sheets

(51) Int. Cl.
*G06Q 20/18* (2012.01)
*G06Q 20/20* (2012.01)
*G06Q 30/02* (2012.01)
*G06Q 20/32* (2012.01)

(52) U.S. Cl.
CPC ....... *G06Q 20/322* (2013.01); *G06Q 30/0241* (2013.01); *G06Q 30/0268* (2013.01); *G06Q 30/0281* (2013.01); *G06Q 30/0601* (2013.01); *G06Q 30/0641* (2013.01)

(58) Field of Classification Search
USPC ................................................ 705/26.1–27.2
See application file for complete search history.

(56) References Cited

U.S. PATENT DOCUMENTS

| | | | |
|---|---|---|---|
| 2003/0023456 A1 | 1/2003 | Dilolo et al. | |
| 2004/0103031 A1* | 5/2004 | Weinschenk | G08B 5/22 705/14 |
| 2006/0065723 A1* | 3/2006 | Palmquist | G06Q 30/06 235/383 |
| 2007/0250447 A1* | 10/2007 | Van Gassel | H04L 9/32 705/57 |
| 2008/0300984 A1* | 12/2008 | Li | G06Q 30/02 705/14.35 |
| 2009/0001270 A1* | 1/2009 | Franco | G01C 21/00 701/200 |
| 2009/0281903 A1 | 11/2009 | Batstein | |
| 2011/0288768 A1* | 11/2011 | Stefani | G01C 21/00 701/201 |
| 2011/0290875 A1 | 12/2011 | Wengrovitz | |
| 2012/0232897 A1* | 9/2012 | Pettyjohn | G10L 15/26 704/235 |
| 2014/0129354 A1 | 5/2014 | Soon-Shiong | |
| 2014/0270400 A1* | 9/2014 | Natale | G06Q 10/02 382/115 |
| 2015/0112826 A1* | 4/2015 | Crutchfield, Jr. | G06Q 30/06 |
| 2015/0199732 A1* | 7/2015 | Vernick | G06Q 30/02 |
| 2015/0294396 A1* | 10/2015 | Goodwin | G06Q 30/0639 705/26.9 |
| 2016/0072915 A1 | 3/2016 | Decanne | |
| 2016/0092972 A1 | 3/2016 | Blatstein et al. | |
| 2016/0232515 A1* | 8/2016 | Jhas | G06Q 30/02 |
| 2017/0337531 A1* | 11/2017 | Kohli | G06Q 20/102 |

FOREIGN PATENT DOCUMENTS

| | | |
|---|---|---|
| CN | 102027502 | 4/2011 |
| CN | 102741874 | 10/2012 |
| JP | 2002373217 A | 12/2002 |
| JP | 2006119792 | 5/2006 |
| JP | 2006195822 | 7/2006 |
| JP | 2007257219 | 10/2007 |
| JP | 2008512782 | 4/2008 |
| JP | 2009217636 | 9/2009 |
| JP | 2010160731 | 7/2010 |
| JP | 6007348 | 10/2016 |
| WO | WO 2011/063177 | 5/2011 |
| WO | WO 2012/177382 | 12/2012 |

OTHER PUBLICATIONS

EP Search Report in European Application No. 18169567.7, dated Sep. 10, 2018, 8 pages.
Japan Office Action in Japanese Application. No. 2018P006, dated Jul. 10, 2019, 4 pages.
JP Office Action in Japanese Application No. 2018086118, dated Apr. 7, 2020, 6 pages (with English translation).
CN Office Action in Chinese Application No. 201810399424.8, dated Apr. 20, 2021, 22 pages (with English translation).
EP Office Action in European Application No. 18169567.7, dated Mar. 31, 2021, 10 pages.

* cited by examiner

FIG. 4

SYSTEM, METHOD, AND COMPUTER-READABLE STORAGE MEDIUM FOR INTERACTIVE KIOSKS

BACKGROUND

In commercial enterprise, the experience for customers, workers, partners, and operators is disconnected. A commercial enterprise can include an airport. From a passenger's point-of-view, for example, after check-in, the passenger waits in and/or roams the airport until boarding time without substantive awareness of the airport eco-system that they are immersed in, and/or awareness of resources that may be beneficial to their journey.

SUMMARY

Implementations of the present disclosure are directed to an interactive kiosk.

In some implementations, an interactive kiosk includes a display, a microphone, and one or more processors that perform operations including receiving user input provided as a spoken query of a user, receiving user-specific data, querying, by a virtual agent, one or more back-end systems based on the user input, and the user-specific data to provide one or more responses, displaying one or more graphical representations of the one or more responses to the user on the display, the one or more graphical representations depicting at least one product for purchase, facilitating a purchase of the at least one product, and providing instructions to the passenger for physical retrieval of the at least one product within a location. Other implementations of this aspect include corresponding systems, apparatus, and computer programs, configured to perform the actions of the methods, encoded on computer storage devices.

These and other implementations can each optionally include one or more of the following features: operations further include associating the purchase of the at least one product with a user identifier of the user for user retrieval of the at least one product from the location; the spoken query is converted to text data, and the one or more back-end systems are queried based on the text data; the location includes an airport, and operations further include retrieving real-time airport data from an airport system based on a departure gate, the real-time airport data comprising one or more of directions within the airport, time to destination, and queue times; the interactive kiosk further includes one or more of a scanner and a camera for determining the user-specific data from the user identifier; the user-specific data includes boarding card data included on a boarding card held by the user, the boarding card comprising a user identifier, and the boarding card data is provided from a boarding card database; at least one response includes advertising data from a third-party retail system; the interactive kiosk further includes at least one component for facilitating the purchase; the at least one component includes a wireless communication component for communication with a mobile device of the user to execute payment using one or more mobile payment systems; operations further include transmitting payment transaction data to a third-party retail system; operations further include transmitting purchase data to a retail outlet within the location, the passenger retrieving the at least one product from the retail outlet based on the purchase data; and the interactive kiosk further includes a speaker.

Implementations of the present disclosure provide one or more of the following advantages. For example, implementations of the present disclosure provide a human-readable interpretation of a result of a predictive model. In this manner, transparency to the predictive model, and the result is provided, moving the predictive model from the realm of black box.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to an interactive kiosk. More particularly, implementations of the present disclosure are directed to an interactive kiosk that embeds a virtual agent into the existing screen-based panels (e.g., advertising screens) in locales (e.g., airports), and blends multiple technologies to provide user services. In some implementations, and as described in further detail herein, interactive kiosks of the present disclosure use speech-recognition technology, and include one or more of the following features: integration with activity-specific data sources (e.g., airport boarding pass systems) for user recognition, integration with real-time queue information, integration with real-time locale information (e.g., departure gates in an airport), use of maps for way finding, integration with e-commerce platforms, use of recommendation analytics to upsell goods based on user information (e.g., destination), integration with point-of-sale (PoS) technology to purchase goods, updating the closest onsite retailer with the purchase information, adding the purchase information to the activity-specific data services to allow for quick-collect at the retailer, and capturing real-time customer feedback, which can be tagged and used for qualitative insight.

Implementations of the present disclosure are described in further detail herein with reference to an example context. The example context includes a user as a passenger within an airport awaiting departure of their flight. In the examples context, the interactive kiosk is provided as an interactive airport kiosk that interacts with multiple back-end systems including, for example, activity-specific data services, such as a boarding pass (card) system. It is contemplated, however, that implementations of the present disclosure can be realized in any appropriate context (e.g., shopping districts).

In some implementations, an interactive kiosk includes a display, a microphone, and one or more processors that perform operations including receiving user input provided as a spoken query of a user, receiving user-specific data, querying, by a virtual agent, one or more back-end systems based on the user input, and the user-specific data to provide one or more responses, displaying one or more graphical representations of the one or more responses to the user on the display, the one or more graphical representations depicting at least one product for purchase, facilitating a purchase of the at least one product, and providing instructions to the passenger for physical retrieval of the at least one product within a location.

In some implementations, and with reference to the example context, the interactive kiosk (interactive airport kiosk) of the present disclosure, can be described as one pillar of multiple pillars in a connected airport, which connects the airport experience for workers, passengers, ecosystem partners, and operators along their experience of service paths, as well as with each other. In some implementations, the connected airport, including the interactive airport kiosk of the present disclosure, implements data sharing based on both traditional and emerging technologies, as well as service design. In some examples, Internet-of-Things (IoT) devices within an airport capture data, and back-end analytics enable the connected airport to function with context and insight. Besides IoT devices, the connected airport also leverages artificial intelligence (AI), augmented reality (AR), mixed reality (MR), virtual reality (VR), and bots (e.g., chatbots). For example: IoT devices enable real-time, location-based information to be collected, and communicated; analytics enable identification and prompting of goods and services, optimizing route planning, and the like; AR can be used for passenger wayfinding through the airport; VR and/or MR can be used for dwell time entertainment, remote visiting of airport tourist sites, and the like, and AI and/or bots can be used to enhance passenger interactions with the connected airport. However, the connected airport may be largely driven by passengers, which can interface with aspects of the connected airport using the interactive airport kiosk of the present disclosure.

Figure 1:
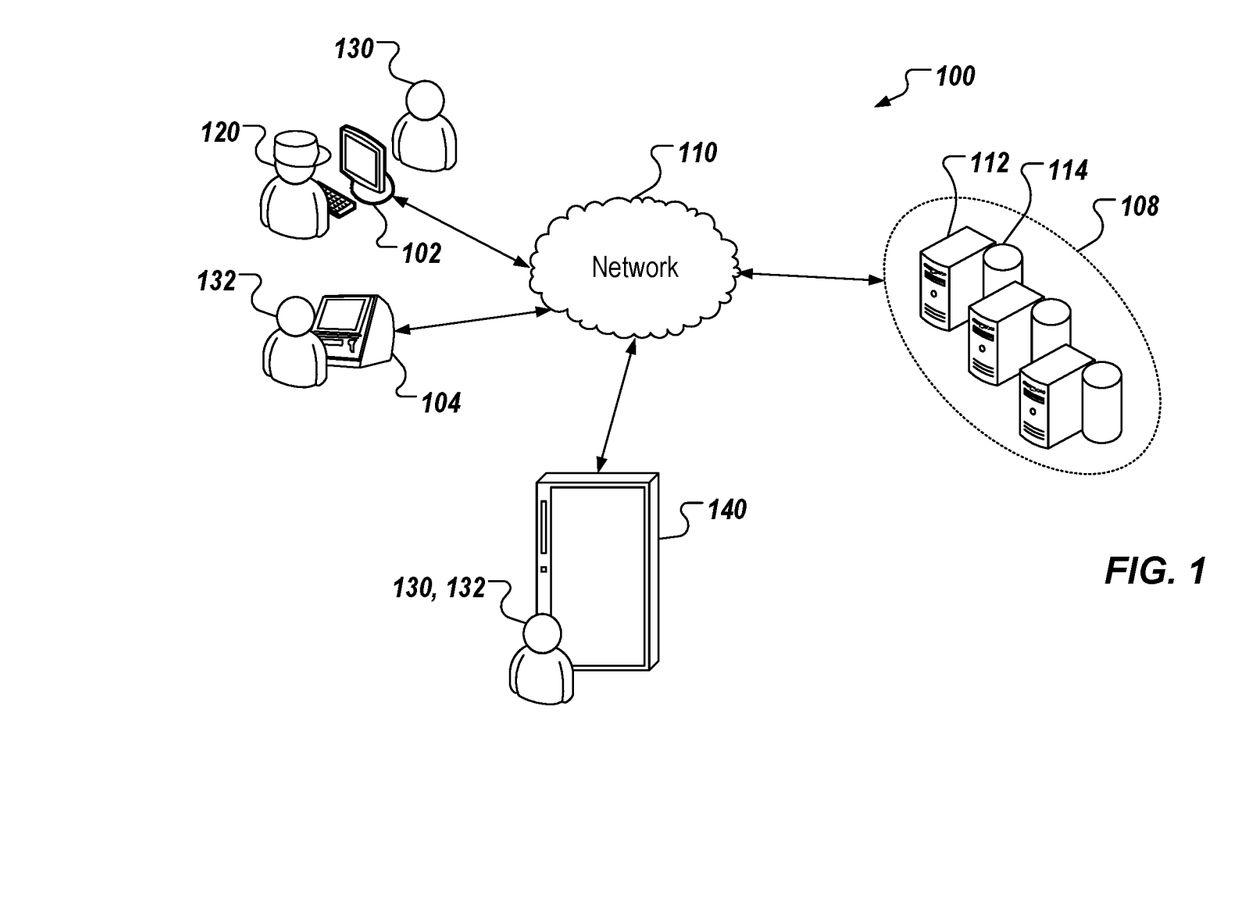
FIG. 1 depicts an example system that can execute implementations of the present disclosure.

FIG. 1 depicts an example system 100 that can execute implementations of the present disclosure. In the depicted example, the system 100 includes computing devices 102, 104 that communicate with a server system 108 over a network 110. In some examples, the computing devices 102, 104 can represent various forms of processing devices including, but not limited to, a desktop computer, a laptop computer, a tablet computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. As discussed in further detail herein, the computing devices 102, 104 can interact with application software provided in the server system 108.

In some implementations, the server system 108 can include one or more 112 servers and databases 114. In some examples, the servers 112 can represent various forms of servers including, but not limited to a web server, an application server, a proxy server, a network server, or a server farm. For example, the servers 112 can be application servers that execute software accessed by computing devices 102, 104. In operation, multiple computing devices 102, 104 (e.g., as clients) can communicate with the servers 112 by way of the network 110. In some implementations, a user can invoke applications available on the servers 112 in a user-interface application (e.g., a web browser) running on the computing device 102, 104. Each application can individually access data from one or more repository resources (e.g., databases 114).

In some implementations, the system 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., computing devices 102, 104) can communicate with the servers 112 via a virtual private network (VPN), Secure Shell (SSH) tunnel, or other secure network connection. In some implementations, the network 110 can include the Internet, a wireless service network and may include the Public Switched Telephone Network (PSTN). In some implementations, the network 110 may include a corporate network (e.g., an intranet), and one or more wireless access points.

In some implementations, the computing devices 102, 104 can each establish its own session with the servers 112. Each session can involve two-way information exchange between the computing devices 102, 104 and the servers 112. For example, a Hypertext Transfer Protocol (HTTP) session can allow the association of information with individual computing devices 102, 104. In some examples, a session can be stateful session, in which at least one of the communicating parts (e.g., the servers 112 or the computing device 102, 104 stores information about the session history during the session). In some examples, stateless communication during a stateless session includes independent requests with associated responses.

In some examples, and with reference to the example context, the computing device 102 can be operated by an agent 120 that checks in a passenger 130 to a travel conveyance (e.g., airplane). To that end, the computing device 102 can communicate with one or more other devices that are directly connected to the computing device 102. Example devices can include a scanner (e.g., a barcode scanner, a QR code scanner), a scale (e.g., to weigh luggage), a printer (e.g., to print boarding passes and/or receipts), and a reader (e.g., a loyalty card, a credit card, driver license and/or passport reader).

In some examples, the computing device 104 can include a passenger check-in kiosk and can be operated by an agent (e.g., the agent 120) and/or by a passenger 132. For example, the passenger 132 can use the computing device 104 to check-in for a flight and print a boarding pass and/or a receipt. To that end, the computing device 104 can include one or more other devices physically integrated therein. Example devices can include a scanner (e.g., a barcode scanner, a QR code scanner), a scale (e.g., to weigh luggage), a printer (e.g., to print boarding passes and/or receipts), and a reader (e.g., credit card, driver license and/or passport reader).

A check-in workflow for travel passengers in the airline industry, for example, can include several different check-in steps, during which an airline-specific reservation system is accessed. For example, a check-in workflow can include one or more steps related to searching for passenger information, assigning seats, handling baggage, adding optional services, receiving payments, and/or finalizing the passenger check-in. As an example of a passenger search step, a check-in agent can enter passenger identification information to locate a particular passenger's travel itinerary within the reservation system to begin the check-in process, and/or to enter additional data. For example, a reader (e.g., reader) can be used to read a loyalty card, a credit card, a driver's license and/or passport information to confirm passenger identity, and to retrieve a reservation associated with the passenger. In a payment step, the passenger can provide payment for the segment or additional services, including for example, checking an oversized bag or upgrading a seat to first class. In some examples, payment can be provided using a credit card which can be read using a reader. After all of the other check-in procedures have been completed, a finalization step may be provided to complete the check-in process. In some examples, one or more boarding passes and/or receipts can be printed.

The example system 100 of FIG. 1 further includes an interactive airport kiosk (IAK) 140 in accordance with implementations of the present disclosure. In some implementations, and as described in further detail herein, the IAK 140 enables the passenger 130, 132 to interact with a connected airport. More particularly, the IAK 140 enables the passenger 130, 132 to receive passenger-specific, and/or passenger-relevant information regarding their journey through the airport. In some implementations, the IAK 140 enables passenger interaction with a virtual agent that receives information from the passenger 130, 132, and based thereon, interacts with one or more back-end systems to conduct services on behalf of the passenger 130, 132. For example, and as described in further detail herein, the passenger 130, 132 can interact with the virtual agent through the IAK 140 to retrieve information about the airport (e.g., departure terminal, maps, shops, food, flight delays, etc.), to retrieve information about their destination (e.g., weather, currency, news), and/or to purchase goods and/or services.

In some implementations, multiple IAKs 140 are located within an airport terminal. For example, one or more IAKs 140 can be located in a pre-security area (e.g., ticketing, check-in, baggage drop/claim), and can be located in a post-security area (e.g., departure lounge, food court, shopping court, gates). In a pre-security context, the IAK 140 of the present disclosure is distinct from other types of kiosks, such as a passenger check-in kiosk (e.g., the computing device 104). For example, a passenger check-in kiosk may have limited, task-specific functionality (e.g., specific to the task of checking a passenger in for a flight), and may be specific to a particular airline. In contrast, and as described in further detail herein, the IAK 140 of the present disclosure enables passengers to connect and interact with multiple systems through the connected airport.

Figure 2:
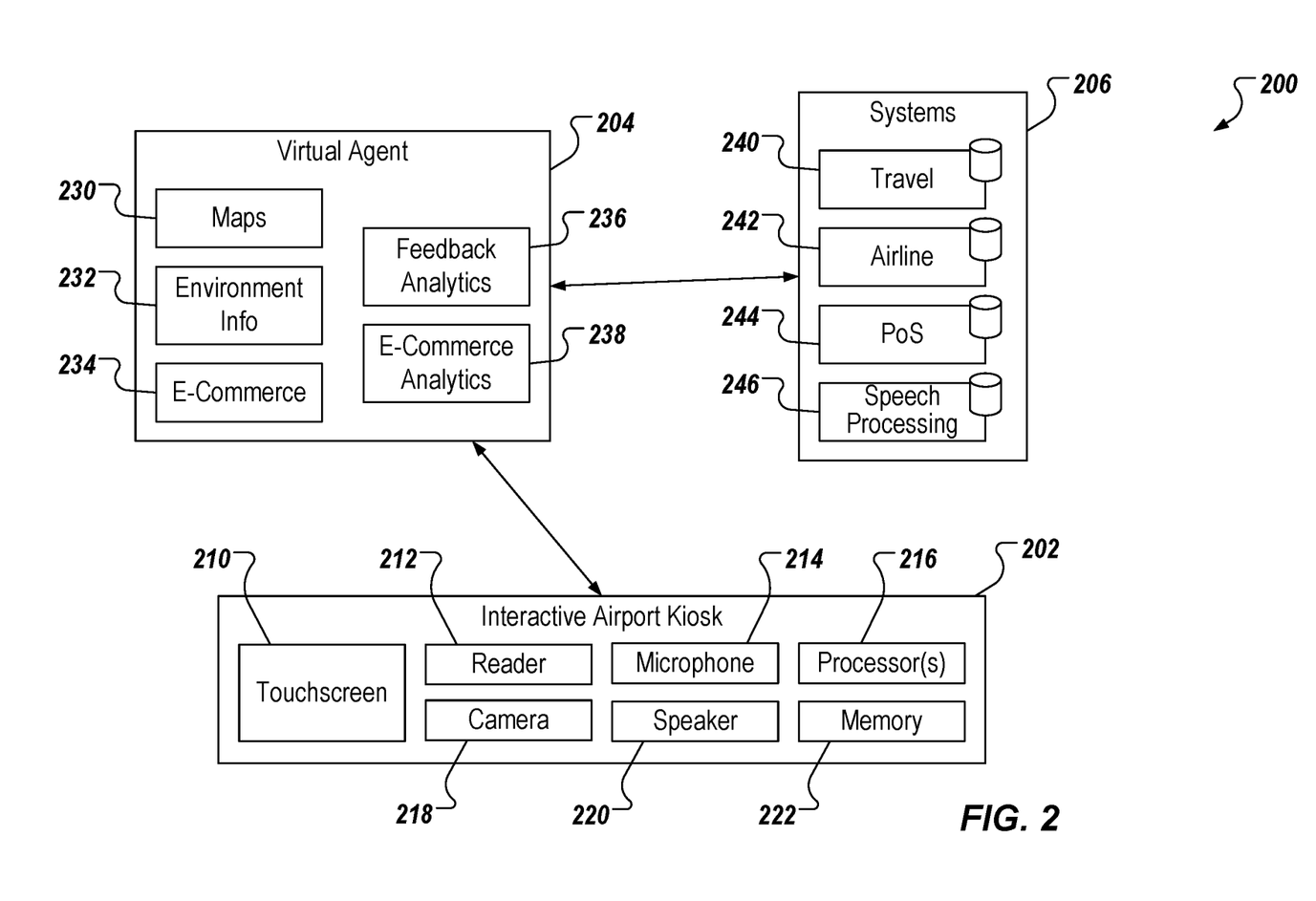
FIG. 2 depicts an example conceptual architecture in accordance with implementations of the present disclosure.

FIG. 2 depicts an example conceptual architecture 200 in accordance with implementations of the present disclosure. With reference to the example context, the example conceptual architecture 200 includes an IAK 202, a virtual agent 204, and back-end systems 206. In some implementations, the virtual agent 204 is hosted on one or more server systems, and the IAK 202 communicates with the virtual agent 204 over a network (e.g., the network 110 of FIG. 1). In some implementations, at least a portion of the virtual agent 204 is hosted within the IAK 202 itself.

In the depicted example, the IAK 202 includes a touchscreen 210 (e.g., a display that is sensitive to user contact), a reader (e.g., a barcode scanner, a QR code scanner, credit card reader), a microphone, one or more processors 216, a camera 218 (e.g., still images, video), a speaker 220, and memory 222. In the depicted example, the virtual agent 204 includes a maps module 230, an environment information module 232, an e-commerce module 234, a feedback analytics module 236, and an e-commerce analytics module 238. In the depicted example, the back-end systems 206 include a travel system 240, an airline system 242, a PoS system 244, and a speech processing system 246. It is contemplated, however, that the virtual agent 204 can interact with any appropriate systems including back-end systems not depicted in FIG. 2.

In some implementations, a passenger (e.g., the passenger 130, 132 of FIG. 1) interacts with the IAK 202. Example passenger interactions can include tactile (e.g., touching the touchscreen 210), and verbal (e.g., speaking to the IAK 202, which speech is recorded as speech data through the microphone 214). In some examples, the IAK 202 displays one or more of an advertisement, flight information (e.g., departures, arrivals), and general information (e.g., airport map). In response to an interaction of a passenger, the IAK 202 displays one or more help screens to provide a visual response, such as those described in further detail herein with reference to FIGS. 3A-3F. In some examples, in response to the interaction of the passenger, the IAK 202 provides an audible response (e.g., playing audio ("Do you need any help?") through the speaker 220.

In accordance with implementations of the present disclosure, the passenger interacts with the virtual agent 204 through the IAK 202. For example, the passenger can input a query to the IAK 202 (e.g., a spoken query), which query is recorded as speech data that is provided to the virtual agent 204. In some example, the speech data is processed to provide text data. For example, the virtual agent 204 can provide the speech data to the speech processing system 246, which converts the speech data to text data, and provides the text data to the virtual agent 204. In some examples, the virtual agent 204 performs one or more functions based on the text data. For example, in response to the passenger indicating that they would like assistance, the virtual agent 204 can prompt the passenger for information. For example, the virtual agent 204 can provide computer-executable instructions to the IAK 202 to provide visual responses and/or audible responses. In response to the passenger requesting assistance, for example, the IAK 202 can display a response including "Great, can you hold your boarding pass up to the camera?" (which can also be audibly played through the speaker 220).

In some examples, in response to the passenger holding an object in front of the camera 218, the IAK 202 can capture one or more images, which can be processed to determine passenger-specific information. For example, the passenger can hold their boarding pass up to the camera, which can capture one or more images of the boarding pass. In some examples, the boarding pass can be a physical boarding pass (e.g., printed on paper). In some examples, the boarding pass can be a virtual boarding pass (e.g., displayed on a screen of a mobile device that the passenger carries). In some examples, the virtual agent 204 can provide an image of the boarding pass to a back-end system, which can process the image to provide boarding pass data. In some examples, the image can be processed to recognize text (e.g., passenger name, date of departure, time of departure, flight number, origination airport, destination airport, program membership number). In some examples, the image can be processed to decode information from a machine-readable code (e.g., bar code, QR code). In accordance with implementations of the present disclosure, the virtual agent 204 can query one or more back-end systems based on the boarding pass data. For example, the virtual agent 204 can query the travel system 240, and/or the airline system 242 to retrieve passenger-specific information.

In some implementations, the virtual agent 204 determines what content to present (e.g., visually, audibly) to the passenger using the IAK 202 based on retrieved information, as well as an originating passenger query (e.g., a query that initiated an on-going interaction with the passenger). In some examples, the content is determined based on personalized information from the passenger, location information (e.g., the current location of the passenger (kiosk location), the gate of the passenger's departure), and the passenger's query. For example, the passenger can request directions to their gate, and/or information about shopping, restaurants, and/or facilities within the airport. The virtual agent 204 can query respective back-end systems to combine local airport environment information, and present content that is responsive to the passenger's query.

In some implementations, the IAK 202 integrates with airport's local information system to receive information related to real-time security queueing times, timetables for connections (e.g., local bus/rail), time to departure terminals (e.g., minutes walk), and any other appropriate information. As described herein, the IAK 202 presents information based on a combination of query, contextual real-time information, and destination information. In this manner, the IAK 202 brings together a disparate group of information to respond to the passenger's journey/query.

In some implementations, the IAK 202 provides offers to the passenger based on destination information. In some examples, the IAK 202 offers the passenger the option to see offers relevant to their destination. In some examples, the IAK 202 receives offer information from the virtual agent 204 to recommend goods and/or services that are relevant to the personal profile of the passenger. For example, the virtual agent 204 requests and receives information from third-party retailer systems (e.g., listings of items on offer, current stock availability, pick-up location within the airport, menus etc.). In some examples, the virtual agent 204 interacts through a travel API that provides information on the destination airport, and/or connecting airport (e.g., weather at destination), which information can be used to recommend goods/services to the passenger. For example, the virtual agent 204 can interact with a recommendation engine using data from, for example, the travel API, third-party retail systems, passenger information, and the like to recommend potential goods/services based on identification of goods/services most suitable for sale.

In some implementations, the user provides user input (e.g., spoken word) to select and/or purchase goods/services. In some examples, the virtual agent 204 interacts with one or more mobile payment services and a boarding pass system (e.g., as part of the airline service 242) to complete purchases. In some examples, the third-party retail system updates stock and supplies in real-time, and updates a real-time collection point (e.g., the PoS system 244). In some examples, the PoS system 244 emails a receipt to an email associated with the passenger (e.g., from the passenger profile). In some examples, the PoS system 244 attaches a collection identifier for the pre-paid goods/services to the passenger boarding card. In this manner, the passenger can walk to the designated collection point, an agent of the retailer can scan the boarding card to determine the collection identifier, and can provide the goods/services to the passenger.

Figure 3A:
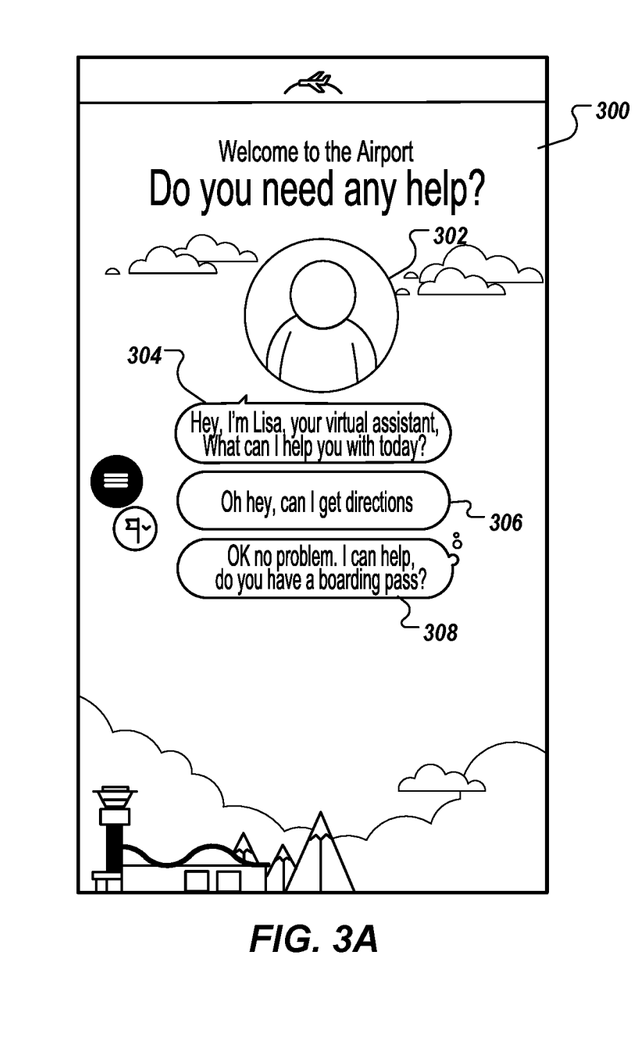
FIGS. 3A-3F depict example interfaces in accordance with implementations of the present disclosure.

FIGS. 3A-3F depict example interfaces in accordance with implementations of the present disclosure. With particular reference to FIG. 3A, an example interface includes a landing interface 300, which functions as a start screen for passenger interaction with an IAK. In some implementations, the landing screen 300 can be displayed in response to initial passenger interaction with an IAK. For example, the IAK displays an advertisement, and, in response to passenger input, displays the landing interface 300 in place of the advertisement. Example passenger input can include tactile input (e.g., the passenger touching the screen of the IAK), and/or verbal input (e.g., the passenger verbally communicating with the IAK).

In some implementations, a virtual agent initiates a visual and/or verbal dialogue with the passenger through the IAK. In the example of FIG. 3A, a graphical representation 302 of the virtual agent is provided. In some examples, in response to the initial passenger input, and display of the landing screen 300, the virtual agent can request passenger-specific information. In the depicted example, the landing interface 300, the virtual agent requests whether the passenger has a boarding pass. This can include a visual request, such as by displaying a graphical representation 304 of a question on the landing screen, and/or an audible request, such as playing an audible request to the passenger through a speaker of the IAK. The passenger can provide a response. In the depicted example, the passenger provides an affirmative response (e.g., a verbal response that is captured by a microphone of the IAK, and is translated to text) depicted as a graphical representation 306, and the virtual agent instructs the user to provide boarding pass information through a graphical representation 308 (e.g., hold their boarding pass up to a camera of the IAK).

Figure 3B:
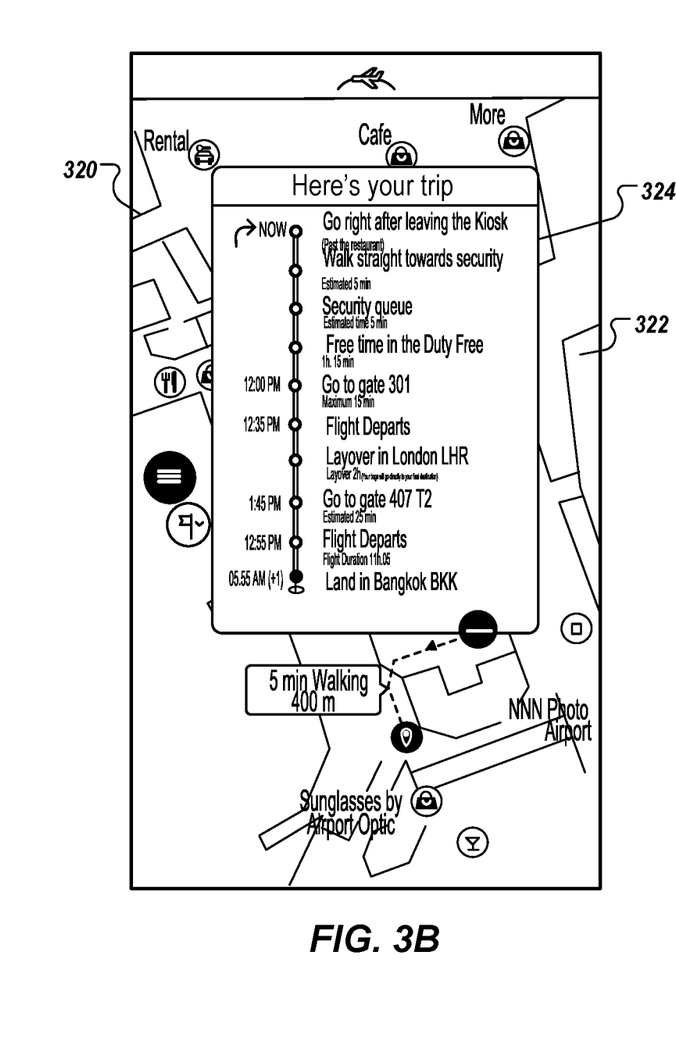

FIG. 3B depicts a passenger-specific information screen 320. In some examples, the passenger-specific information screen 320 is displayed in response to capturing passenger-specific information (e.g., information recorded on a boarding card of the passenger held to the camera, as requested by the virtual agent). For example, the virtual agent can retrieve passenger-specific, and/or passenger-relevant information, which can be displayed on the passenger-specific information screen 320. In the depicted example, the passenger-specific information screen 320 includes a map 322 of at least a portion of the airport, and a trip summary 324. In some examples, the map 322 can be provided as passenger-relevant information (e.g., the map itself is not specific to any passenger, but the portion of the map being displayed is relevant to the particular passenger's trip). In some examples, the trip summary 324 can be provided as passenger-specific information (e.g., the information displayed is specific to the particular passenger). In the depicted example, the trip summary 324 is provided as a timeline that includes directions, waypoints, time between waypoints, estimates of free time in respective locations, flight information (e.g., gate, layover, departure time, arrival airport, arrival time). In the depicted example, the map 322 displays a route for the passenger through the airport.

Figure 3C:
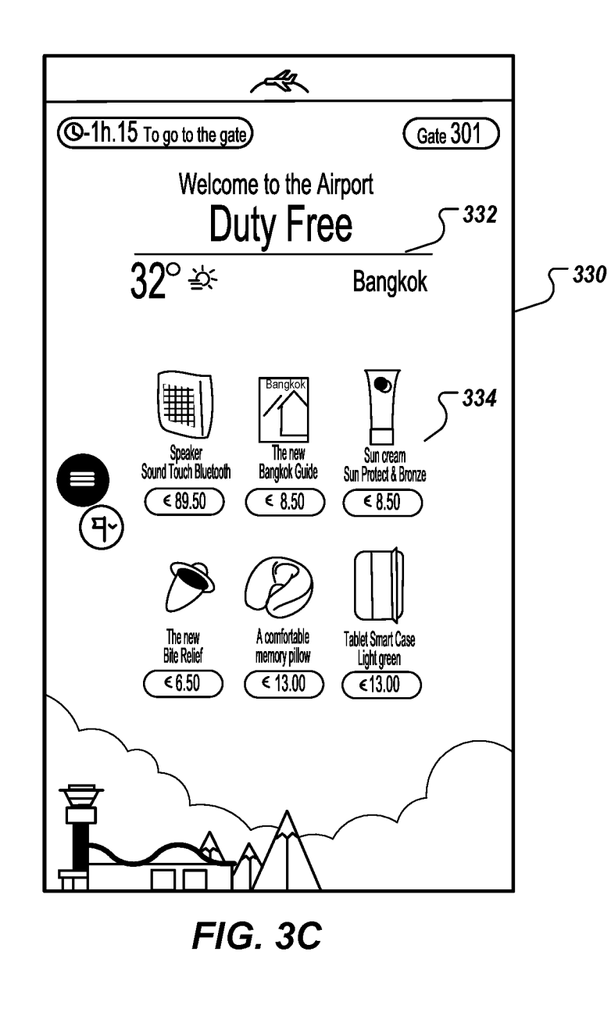

FIG. 3C depicts an example e-commerce screen 330. In some examples, the virtual agent can display the e-commerce screen 330 based on passenger information. In the depicted example, the e-commerce screen 330 displays a graphical representation 332 of weather information for the destination of the particular passenger, and graphical representations 334 of goods and/or services that may be relevant to the passenger. In some examples, goods/services that are depicted are generic to airplane passengers (e.g., flight comfort products, such as travel pillows, travel toiletries). In some examples, goods/services that are depicted are specific to the particular passenger (e.g., sun screen based on destination climate, destination-specific travel guide, bite relief (mosquitos) based on destination-specific environment).

Figure 3D:
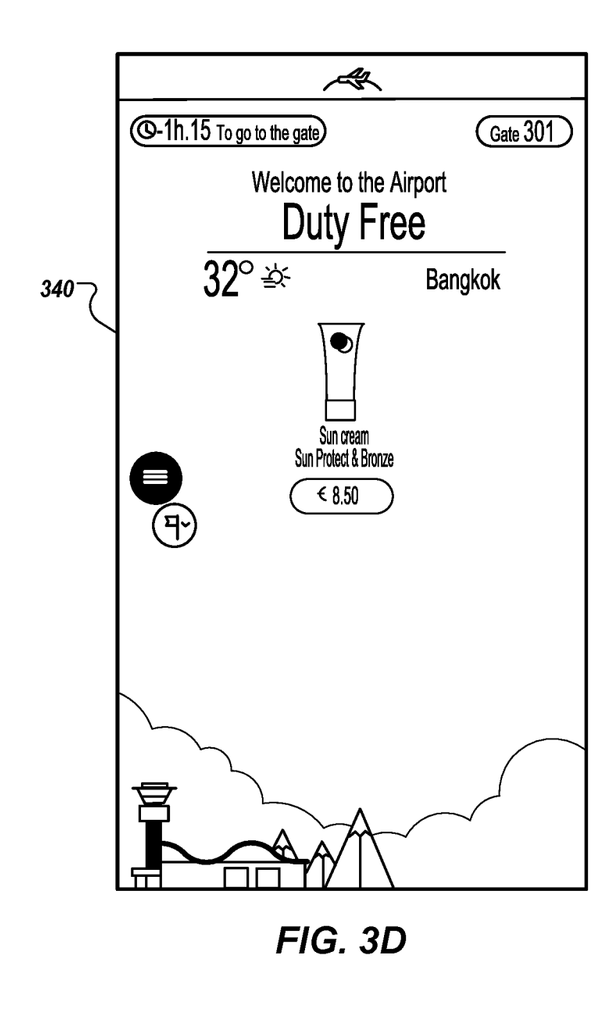

FIG. 3D depicts an example payment screen 340. In some examples, the payment screen 340 is displayed in response to passenger selection of one or more goods/service from the e-commerce screen 330 (e.g., the passenger touches the touchscreen of the IAK at the graphical representation 334 of a selected good). In accordance with implementations of the present disclosure, the virtual agent facilitates payment for the good(s)/service(s) through the IAK. For example, the passenger can provide payment information through the IAK. In one example, the passenger can use a mobile payment service through their mobile device. Example mobile payment services can include Android Pay, Apple Pay, Samsung Pay, PayPal, and the like. In some examples, the passenger can initiate a mobile payment application on their mobile device, and hold the screen of the mobile device to the IAK. In some examples, the IAK can capture mobile payment information through the camera (e.g., capturing an image of the screen of the mobile device). In some examples, the IAK can capture mobile payment information through NFC with the mobile device. Although not depicted in FIG. 3D, the virtual agent can inform the passenger as to where the good(s)/service(s) can be retrieved. For example, the IAK can display a screen depicting a map to a duty free shop, and a counter within the duty free shop, where the passenger can pick-up the goods purchased through the IAK.

Figure 3E:
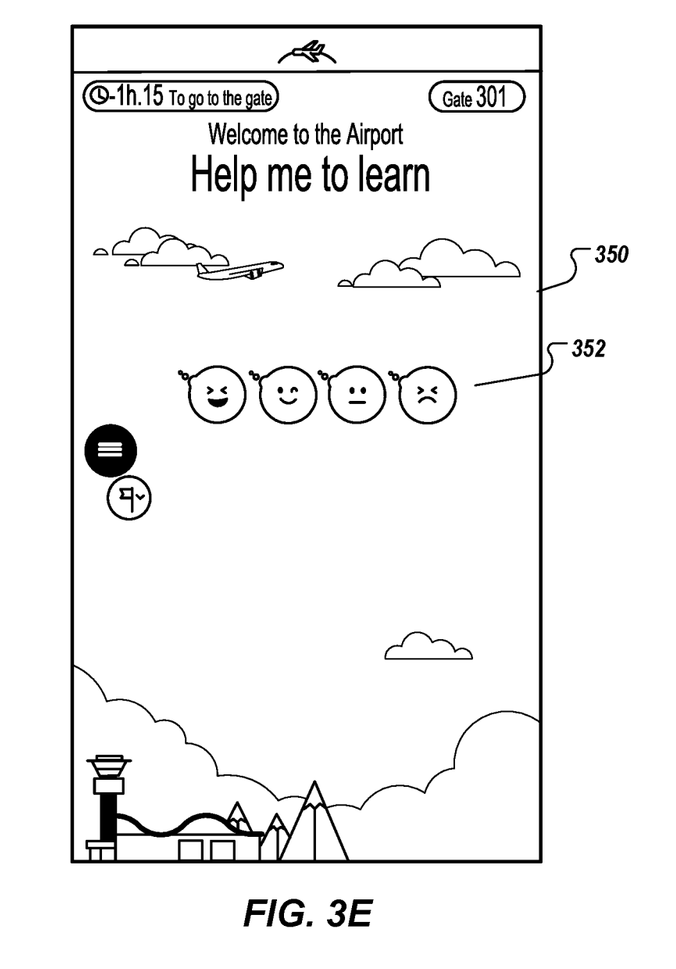
Figure 3F:
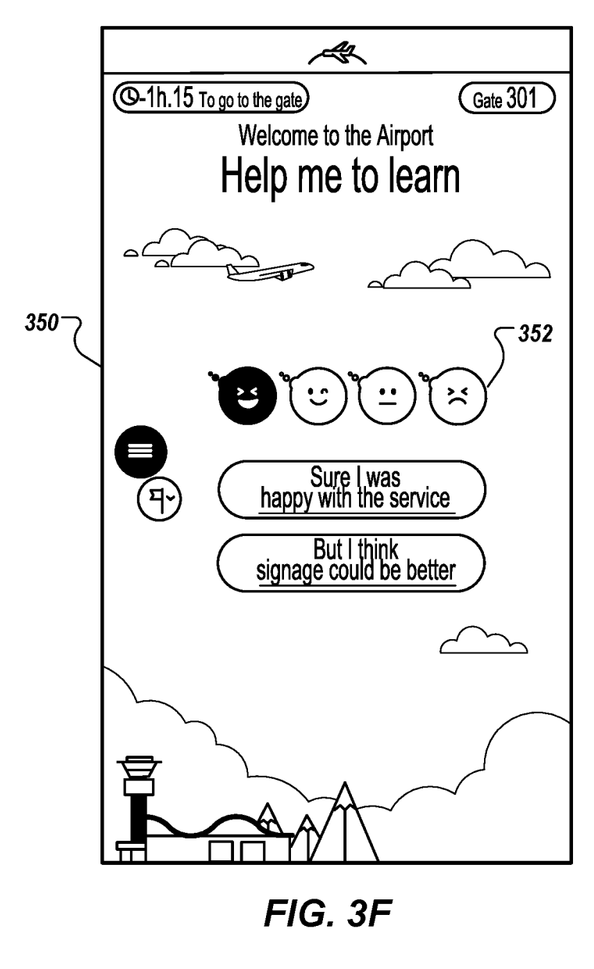

FIGS. 3E and 3F depicts an example feedback screen 350 that can be displayed to illicit passenger feedback. In the depicted example, graphical representations 352 depicting respective ratings (e.g., very satisfied, satisfied, no opinion, dissatisfied). In some examples, the passenger can select a rating (e.g., by touching the touchscreen of the IAK at a respective graphical representation). In some examples, the passenger can provide other forms of feedback. For example, the passenger can provide verbal feedback, which is translated into text (e.g., as depicted in FIG. 3F).

Figure 4:
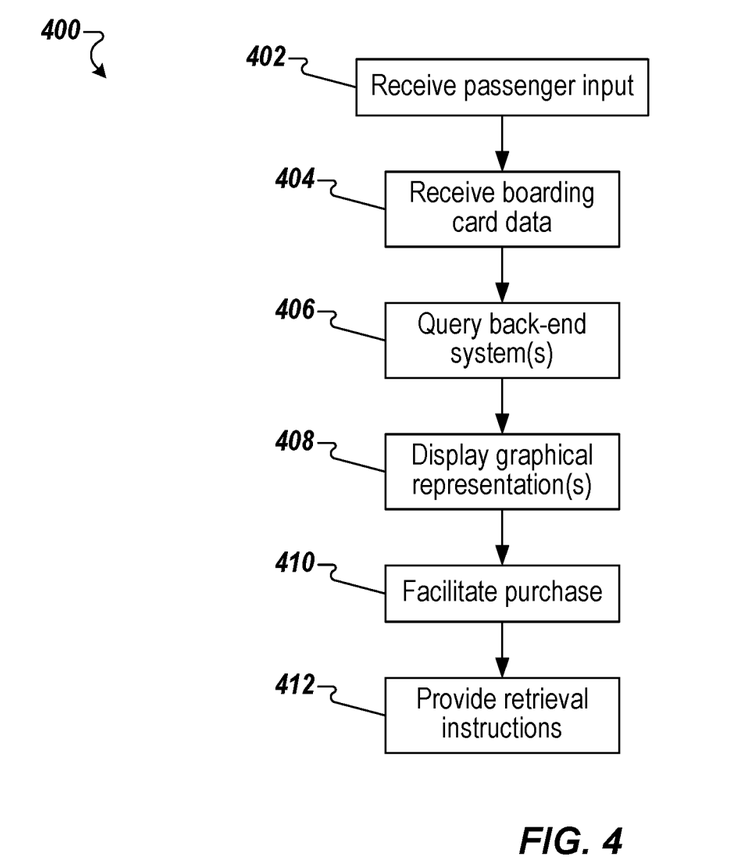
FIG. 4 depicts an example process that can be executed in implementations of the present disclosure.

FIG. 4 depicts an example process 400 that can be executed in implementations of the present disclosure. In some examples, the example process 400 can be provided using one or more computer programs that are executed using one or more computing devices. In some examples, the process 400 is executed to provide at least a portion of a connected airport in accordance with implementations of the present disclosure.

Passenger input is received (402). For example, a virtual agent receives a spoken query of a passenger using an IAK of the present disclosure. Boarding card data is received (404). For example, the virtual agent receives boarding card data based on a boarding card that the passenger displays to the IAK. In some examples, a camera of the IAK captures an image of the boarding card, which image is processed to provide the boarding card data. In some examples, a scanner of the IAK scans a machine-readable code printed on the boarding card, the machine-readable code encoding the boarding card data.

One or more back-end systems are queried based on the passenger input, and the boarding card data to provide one or more responses (406). For example, the virtual agent queries one or more back-end systems, as described herein. One or more graphical representations of the one or more responses to the passenger are displayed (408). For example, the IAK displays graphical representations of the responses, the graphical representations depicting at least one product (e.g., good, service) for purchase. A purchase of the at least one product is facilitated (410). For example, the IAK enables the passenger to purchase the product using one or more mobile payment services, as described herein. Instructions to the passenger are provided for physical retrieval of the at least one product within the airport (412).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. An interactive kiosk that enables users to connect and interact with multiple systems of a connected location, the connected location comprising a departure location, the interactive kiosk comprising:
   a display;
   a microphone;
   a scanner that scans one or more physical articles;
   one or more processors; and
   a computer-readable storage device coupled to the one or more processors and having instructions stored thereon which, when executed by the one or more processors, cause the one or more processors to perform operations comprising:
      receiving user input through the microphone, the user input comprising a spoken query of a user;
      receiving user-specific data based on a boarding card presented to the interactive kiosk and scanned by the scanner, the boarding card being issued to the user at the departure location, and at least a portion of the user-specific data representing an activity of the user within the connected location, the user-specific data comprising boarding card data included on the boarding card held by the user, the boarding card comprising a user identifier, and the boarding card data is provided from a boarding card database;
      transmitting a request comprising the user input and the user-specific data from the interactive kiosk to a virtual agent, the virtual agent connecting the interactive kiosk to and querying one or more back-end systems of the connected location based on the user input, and the user-specific data to provide one or more responses;
      displaying one or more graphical representations of the one or more responses to the user on the display, the one or more graphical representations depicting at least one product for purchase;
      facilitating a purchase of the at least one product, wherein a collection identifier for the at least one product is attached to the boarding card presented to the interactive kiosk to enable an agent of a retailer of the at least one product to identify the user as the purchaser of the at least one product; and providing instructions to the passenger for physical retrieval of the at least one product within the departure location, the instructions comprising a map displaying a route for the user through the departure location.

2. The interactive kiosk of claim 1, wherein operations further comprise associating the purchase of the at least one product with a user identifier of the user for user retrieval of the at least one product from the connected location.

3. The interactive kiosk of claim 1, wherein the spoken query is converted to text data, and the one or more back-end systems are queried based on the text data.

4. The interactive kiosk of claim 1, wherein the connected location comprises an airport, and operations further comprise retrieving real-time airport data from an airport system based on a departure gate, the real-time airport data comprising one or more of directions within the airport, time to destination, and queue times.

5. The interactive kiosk of claim 1, further comprising a camera for generating one or more images comprising data used to at least partially determine the one or more responses.

6. The interactive kiosk of claim 1, wherein at least one response comprises advertising data from a third-party retail system.

7. The interactive kiosk of claim 1, further comprising at least one component for facilitating the purchase.

8. The interactive kiosk of claim 7, wherein the at least one component comprises a wireless communication component for communication with a mobile device of the user to execute payment using one or more mobile payment systems.

9. The interactive kiosk of claim 1, wherein operations further comprise transmitting payment transaction data to a third-party retail system.

10. The interactive kiosk of claim 1, wherein operations further comprise transmitting purchase data to a retail outlet within the connected location, the passenger retrieving the at least one product from the retail outlet based on the purchase data.

11. The interactive kiosk of claim 1, further comprising a speaker.

12. A computer-implemented method for providing at least a portion of a connected location that includes an interactive kiosk that enables users to connect and interact with multiple systems of the connected location, the connected location comprising a departure location, the method being executed using one or more processors and comprising:

receiving user input comprising a spoken query of a user, the user input being received through a microphone of the interactive kiosk;

receiving user-specific data based on a boarding card presented to the interactive kiosk and scanned by a scanner of the interactive kiosk, the boarding card being issued to the user at the departure location, and at least a portion of the user-specific data representing an activity of the user within the connected location, the user-specific data comprising boarding card data included on the boarding card held by the user, the boarding card comprising a user identifier, and the boarding card data is provided from a boarding card database;

transmitting a request comprising the user input and the user-specific data from the interactive kiosk to a virtual agent, the virtual agent connecting the interactive kiosk to and querying one or more back-end systems of the connected location based on the user input, and the user-specific data to provide one or more responses;

displaying one or more graphical representations of the one or more responses to the user on the display, the one or more graphical representations depicting at least one product for purchase;

facilitating a purchase of the at least one product, wherein a collection identifier for the at least one product is attached to the boarding card presented to the interactive kiosk to enable an agent of a retailer of the at least one product to identify the user as the purchaser of the at least one product; and providing instructions to the passenger for physical retrieval of the at least one product within the departure location, the instructions comprising a map displaying a route for the user through the departure location.

13. The method of claim 12, further comprising associating the purchase of the at least one product with a user identifier of the user for user retrieval of the at least one product from the connected location.

14. The method of claim 12, wherein the spoken query is converted to text data, and the one or more back-end systems are queried based on the text data.

15. The method of claim 12, wherein the connected location comprises an airport, and the method further comprises retrieving real-time airport data from an airport system based on a departure gate, the real-time airport data comprising one or more of directions within the airport, time to destination, and queue times.

16. The method of claim 12, wherein the interactive kiosk comprises a camera for generating one or more images comprising data used to at least partially determine the one or more responses.

17. The method of claim 12, wherein at least one response comprises advertising data from a third-party retail system.

18. The method of claim 12, wherein the interactive kiosk further comprises at least one component for facilitating the purchase.

19. The method of claim 18, wherein the at least one component comprises a wireless communication component for communication with a mobile device of the user to execute payment using one or more mobile payment systems.

20. The method of claim 12, further comprising transmitting payment transaction data to a third-party retail system.

21. The method of claim 12, further comprising transmitting purchase data to a retail outlet within the connected location, the passenger retrieving the at least one product from the retail outlet based on the purchase data.

22. A non-transitory computer-readable storage medium coupled to one or more processors and having instructions stored thereon which, when executed by the one or more processors, cause the one or more processors to perform operations for providing at least a portion of a connected location that includes an interactive kiosk that enables users to connect and interact with multiple systems of the connected, the connected location comprising a departure location, the operations comprising:

receiving user input comprising a spoken query of a user, the user input being received through a microphone of the interactive kiosk;

receiving user-specific data based on a boarding card presented to the interactive kiosk and scanned by a scanner of the interactive kiosk, the boarding card being issued to the user at the departure location, and at least a portion of the user-specific data representing an activity of the user within the connected location, the user-specific data comprising boarding card data included on the boarding card held by the user, the boarding card comprising a user identifier, and the boarding card data is provided from a boarding card database;

transmitting a request comprising the user input and the user-specific data from the interactive kiosk to a virtual agent, the virtual agent connecting the interactive kiosk to and querying one or more back-end systems of the connected location based on the user input, and the user-specific data to provide one or more responses;

displaying one or more graphical representations of the one or more responses to the user on the display, the one or more graphical representations depicting at least one product for purchase;

facilitating a purchase of the at least one product, wherein a collection identifier for the at least one product is attached to the boarding card presented to the interactive kiosk to enable an agent of a retailer of the at least one product to identify the user as the purchaser of the at least one product; and providing instructions to the passenger for physical retrieval of the at least one product within the departure location, the instructions comprising a map displaying a route for the user through the departure location.

23. The computer-readable media of claim 22, wherein operations further comprise associating the purchase of the at least one product with a user identifier of the user for user retrieval of the at least one product from the connected location.

24. The computer-readable media of claim 22, wherein the spoken query is converted to text data, and the one or more back-end systems are queried based on the text data.

25. The computer-readable media of claim 22, wherein the connected location comprises an airport, and the method further comprises retrieving real-time airport data from an airport system based on a departure gate, the real-time airport data comprising one or more of directions within the airport, time to destination, and queue times.

26. The computer-readable media of claim 22, wherein the interactive kiosk comprises a camera for generating one or more images comprising data used to at least partially determine the one or more responses.

27. The computer-readable media of claim 22, wherein at least one response comprises advertising data from a third-party retail system.

* * * * *